No. 678,729. Patented July 16, 1901.
R. P. GERLACH.
SAWING OR CUTTING MACHINE.
(Application filed Sept. 10, 1900.)
(No Model.)
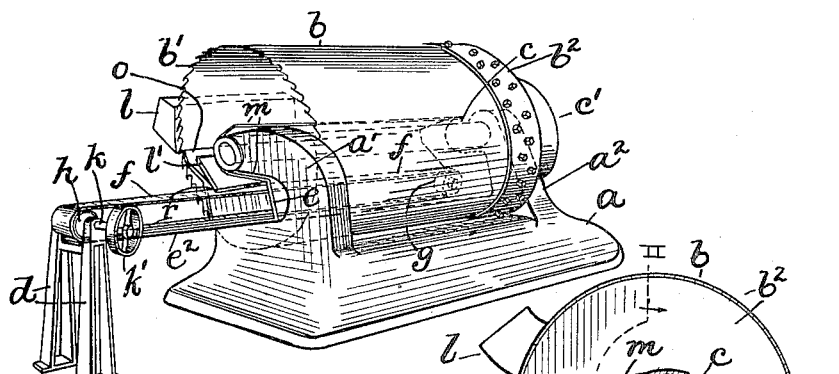
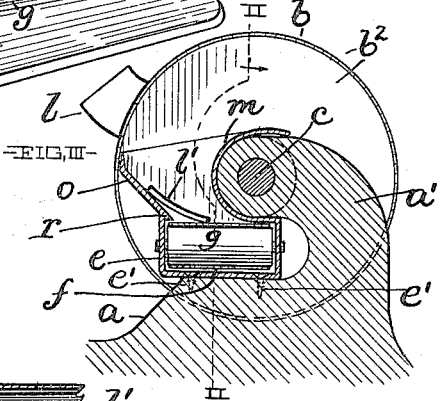
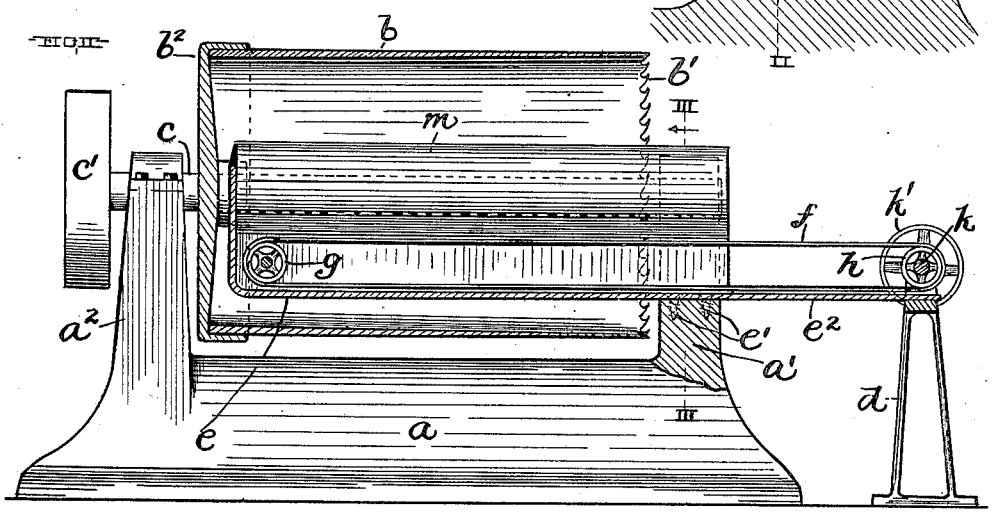
WITNESSES:
Daniel E Daly.
A H Parratt
INVENTOR
Rudolph P. Gerlach
BY
Lynch & Worer
his ATTORNEYS

UNITED STATES PATENT OFFICE.

RUDOLPH P. GERLACH, OF CLEVELAND, OHIO.

SAWING OR CUTTING MACHINE.

SPECIFICATION forming part of Letters Patent No. 678,729, dated July 16, 1901.

Application filed September 10, 1900. Serial No. 29,484. (No model.)

*To all whom it may concern:*

Be it known that I, RUDOLPH P. GERLACH, a resident of Cleveland, in the county of Cuyahoga and State of Ohio, have invented certain new and useful Improvements in Sawing or Cutting Machines; and I do hereby declare the following to be a full, clear, and exact description of the invention, such as will enable others skilled in the art to which it pertains to make and use the same.

My invention relates to improvements in sawing or cutting machines, and pertains more especially to the combination, with a suitably-supported and suitably-operated cylinder saw, of an endless belt or conveyer extending into and longitudinally of the shell of the saw and arranged in the position required to receive staves, slabs, saw-dust, or other material cut from a log, block, or piece of wood or other material that is to be operated upon by the saw.

The primary object of this invention is to provide a conveyer adapted to remove any object or material falling or released within the shell of the saw forwardly from the saw with facility and positively, so that there is no liability of such object or material remaining within the said shell.

With this object in view and to the end of realizing other advantages hereinafter appearing the invention consists in certain features of construction and combinations of parts hereinafter described, and pointed out in the claims.

In the accompanying drawings, Figure I is a view in perspective of a sawing or cutting machine suitable for cutting staves or other objects or material and provided with my improvements. Fig. II is a left-hand side elevation, partly in longitudinal section, on line II II, Fig. III, and is drawn on a larger scale than Fig. I. Fig. III is a front end elevation in section on line III III, Fig. II.

Referring to the drawings, $a$ designates the supporting-bed or stationary frame of a sawing-machine, provided with an ordinary cylinder-saw $b$, that is supported from the said frame or bed in any approved manner. In the machine illustrated the saw is operatively mounted or fixed upon a shaft $c$, that is arranged centrally, horizontally, and longitudinally of the saw. The shaft $c$ has bearing within the free ends of two arms or standards $a'$ and $a^2$, that project upwardly from and are integral with the bed $a$ at opposite ends, respectively, of the saw, and the forward arm or standard $a'$ extends upwardly from the bed at the right-hand side of the saw and at the right-hand side of the shaft and thence curves leftwardly, so as not to obstruct the space below and at the left-hand side of the shaft within the cylindrical shell of the saw. The said shell of the saw is serrated at its forward end, as at $b'$, in the usual manner and has its rear end rigid with a head $b^2$, that is operatively mounted or fixed upon the shaft. The shaft extends through the head $b^2$ of the saw and at the outer side of the said head is provided with a driving-pulley $c'$, to which power is applied in any approved manner.

A trough $e$ is arranged within and extends longitudinally of the shell of the saw below and at the left-hand side of the shaft. This trough extends to or beyond the forward end of the saw and is rendered stationary in any approved manner. In the machine illustrated the trough is fixed to the forward end of the bed or stationary framework of the machine, as at $e'$, and has the bottom thereof elongated forwardly, as at $e^2$, and fixed at its forward end in any approved manner to a pair of uprights or standards $d$, that are arranged a suitable distance apart forwardly of the bed of the machine. The trough extends, preferably, into the extreme rear end of the shell of the saw.

An endless belt or conveyer $f$ is arranged within and extends longitudinally of the aforesaid trough below the shaft and is preferably wide enough to extend widthwise into close proximity to the side walls of the trough. The belt or conveyer $f$ extends, preferably, into the extreme rear end of the trough $e$ and there leads over a roller $g$, that is arranged horizontally and transversely of and suitably supported from the side walls of the trough. The belt or conveyer $f$ extends forwardly of the trough a suitable distance and at its forward end leads over a roller $h$, that is arranged horizontally and transversely of the belt or conveyer and is suitably supported from the aforesaid uprights or standards $d$. The roller $h$ is fixed or operatively mounted upon a correspondingly-arranged shaft $k$, that has bearing in the upper ends of the said standards $d$ and is provided with a driving-pulley $k'$, to which power is applied in any approved manner.

In Figs. I and III a bolt $l$, of wood, is shown in cross-section, having been fed longitudinally of the saw, and a stave $l'$, cut from the said bolt, is shown lodging upon the belt or conveyer, that instantly commences to feed the said stave forwardly from within the shell of the saw.

The right-hand side wall of the trough $e$ is preferably extended in under and upwardly around the left-hand side of the shaft and over the shaft, so as to form a guard $m$ for preventing a stave or other object cut or sawed by the saw from the bolt or block of wood or other material from falling onto or against the shaft.

The left-hand side wall of the trough $e$ is extended, preferably, upwardly into close proximity to the inner peripheral surface of the shell of the saw next below the place at which the sawing operation is performed, so as to form a guide $o$ for guiding the stave or object cut or sawed from a bolt or block of wood or other material to the belt or conveyer. Preferably the left-hand side wall of the trough is provided with an internal guard-forming flange $r$, that extends longitudinally of the trough and overhangs and is arranged in close proximity to the left-hand side of the belt or conveyer.

Although I have illustrated a sawing-machine wherein a cylinder-saw is mounted upon a shaft extending through the shell of the saw, I would have it understood that my invention is not limited to this type of cylinder-saw nor to any other detail of construction, but embraces, broadly, the combination, with a suitably-supported and suitably-operated saw comprising a shell serrated at one end, of a suitably-supported and suitably-operated endless belt or conveyer extending into and longitudinally of the said shell and arranged as required to feed any object or material dropping or released within the shell forwardly from the saw.

What I claim is—

1. The combination, of a bed or stationary framework, a saw-forming shell serrated at its forward end, a shaft extending centrally and longitudinally of and through the saw, a head rigid with the rear end of the shell and fixed or operatively mounted upon the shaft, a standard or bracket affording bearing for the said shaft at the rear end of the saw and rigid with the base or framework, an endless belt or conveyer supported from the bed or framework and arranged within and longitudinally of the shell below the shaft, and another standard or bracket rigid with the bed or stationary framework and arranged at the right-hand side of the belt or conveyer and overhanging the said conveyer and having its free end affording bearing for the shaft at the forward end of the saw.

2. The combination, with a saw comprising a suitably-operated and suitably-supported rotary shell serrated at its forward end, and a suitably-supported stationary trough arranged within and extending longitudinally of the aforesaid shell, of a suitably-operated and suitably-supported endless belt or conveyer arranged within and longitudinally of the trough, and means for guiding the object or material that is to be made by the saw onto the aforesaid belt or conveyer.

Signed by me at Cleveland, Ohio, this 30th day of August, 1900.

RUDOLPH P. GERLACH.

Witnesses:
C. H. DORER,
A. H. PARRATT.